United States Patent Office 2,904,509
Patented Sept. 15, 1959

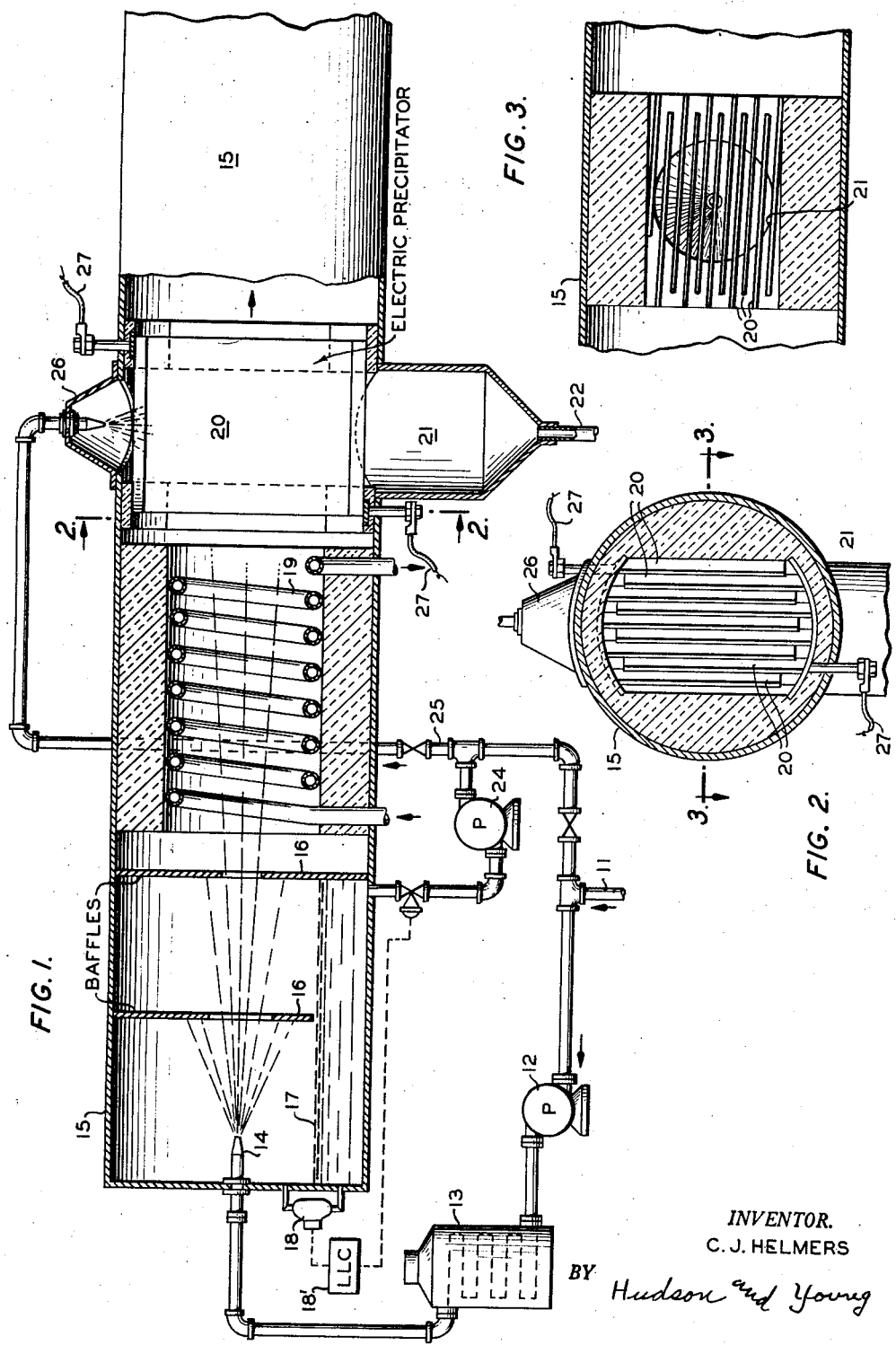

2,904,509

PROCESS AND APPARATUS FOR DISTILLING PETROLEUM HYDROCARBONS

Carl J. Helmers, Bartlesville, Okla., assignor to Phillips Petroleum Company, a corporation of Delaware Application December 27, 1955, Serial No. 555,649

10 Claims. (Cl. 208—357)

This invention relates to an improved method and apparatus for a distillation process. In a more specific aspect it relates to an improved method of distillation wherein oil is heated by radiant heat after being heated and flashed and wherein liquid and solid materials are removed from the vapors after the flashing step. In another aspect it relates to an apparatus for carrying out the above method.

In normal refinery operations the crude oil is topped to remove gasoline, kerosene, and other light fractions of the crude. The topped or reduced crude which remains is then flashed in a vacuum distillation operation to remove and recover the distillable materials from the tar and solids contained therein. A distillate from this vacuum distillation operation usually comprises the charge stock to a catalytic cracking operation. Complete removal of tar and solids and at the same time recovery of all the vaporizable fractions of the oil is desirable for efficient and economical operation of the cracking process but has, in the past, been impracticable if not impossible in refinery operations. In order to obtain a clean oil for use in the catalytic cracking operation a portion of the distillable oil has been allowed to be expelled with the residue. Obviously improved separation of these materials would present a great savings of useful products being wasted at present.

This application is a continuation-in-part of my application Serial No. 300,002, filed July 21, 1952, now abandoned.

It is an object of this invention to provide an improved method for separating volatile materials from non-volatile materials in a distillation process.

Another object is to provide a method for removing tar and entrained dissolved inorganic or organic metallo compounds from crude petroleum.

Another object is to provide a method for employing the principle of heat added by radiant heat at very low pressure to facilitate the vaporization of the crude oil.

Another object is to provide apparatus for carrying out the above methods.

Other objects will be evident to one skilled in the art upon reading the specification and drawing of this invention.

This invention embodies the principle of very low pressure to facilitate the vaporization of the oil, control of spray angle of the oil entering the vacuum zone by means of baffles, the addition of supplemental heat to unvaporized small oil droplets for a brief period of time, and extraction of the tar, mist, and any remaining liquid droplets from the effluent vapors. The last step is particularly desirable in order that a clean vacuum oil containing negligible amounts of tar and entrained inorganic or metallo organic compounds can be produced and used subsequently as a suitable feed for a catalytic cracking operation. The removal of tar permits utilization of heavy oils which normally cannot be used in the catalytic cracking process because of high coke deposition on the catalyst and concurrent temporary loss of activity of the catalyst. Removal of the metallic constituents is essential since their presence in the feed stream to the catalytic cracker results in permanent deactivation of the catalyst and loss in selectivity of reaction of the catalyst.

In the drawing, Figure 1 is a side view, partly in section, of a preferred embodiment of the apparatus of my invention. Figure 2 is a section taken along the line 2—2 of Figure 1. Figure 3 is a section taken along the line 3—3 of Figure 2.

The attached schematic drawing illustrates a preferred form of the apparatus of this invention as applied to a vacuum still, however the invention is applicable to stills other than vacuum stills. The vacuum still shown in the drawing is contained within a horizontal cylindrical shell 15. Fresh feed, produced by removal of low boiling components in a prior distillation step, enters the unit through line 11, pump 12, heater 13 and spray nozzle 14. Spray nozzle 14 is a conventional narrow angle spray nozzle available on the market. The oil is sprayed into vacuum still shell 15 and baffles 16 disperse or deflect all but the narrowest cone of the spray and return the deflected liquids to sump 17 in the bottom portion of the shell. Liquid level control 18 and 18' maintain a liquid level in this shell in order to prevent breaking the liquid seal. Liquid from the sump can be returned to the fresh feed line 11. The narrow angle cone of the spray which escapes the baffles passes through, without touching, radiant heater 19 and passes from there through the vapor and non-vapor separation means which in this embodiment is illustrated as electrical precipitator 20. Liquid flowing down from the plates of the electrical precipitator accumulate in the sump 21 and may be drawn off through pipe 22. The clean, mist-free vapors emerging from the precipitator pass through the remaining portion of the shell 15 to cooling coils or cooling tower (not shown).

The flashed oil which is deflected by the baffles 16 and collected in sump 17 can be pumped by pump 24 through line 25 through a manifold 26 located above the electrical precipitator so that the oil is caused to run down over the plates, washing solid materials and accumulated droplets into the sump 21 below the electrical precipitator. The electrical precipitator is one of conventional design comprising oppositely charged alternate plates positioned, in a convenitonal still, ta least 4 inches apart. The spacing however will be determined by the size of the vacuum still. Electrical connections are indicated at 27.

Other separation means which can be employed include cyclone separation means, filter screens, filter bags, and the like. The electrical precipitator is the preferred separation means.

The heater indicated at 19 can be a cylindrical section heated directly by electrical heating elements or indirectly by circulation of molten salt, metals or hot flue gases.

In the operation of this preferred vacuum distillation process the fresh feed which enters the unit through line 11 is pressured to 200–500 p.s.i.g. by pump 12 and the oil is heated to a temperature of 500–800° F. in heater 13. The high pressure maintained in the heater coil prevents appreciable vaporization of the oil until it emerges through narrow angle spray nozzle 14. As the hot droplets of oil enter the vacuum flash unit the combined action of the heat content of the oil and the reduced boiling point of the oil permits a portion of the oil to vaporize from the surface of the droplets. The reduction in normal boiling point is achieved by maintaining the absolute pressure of the vacuum flash zone in the range of 0.1 to 100 mm. of mercury. Due to the high kinetic energy of the droplets emerging from the spray nozzle the droplets proceed in essentially a straight line after leaving the nozzle surface. Baffles 16 stop the motion of some of the droplets so that most of the droplets proceeding through the flash chamber are directed along a narrow angle conical path roughly parallel to the axis of the vessel. Droplets striking baffles 16 drain down and are combined in the bottom of the sump 17 from which a portion is returned to the heater by pump 24 and pump 12 at such a rate so as to maintain a constant oil level and seal in sump 17. A portion of this oil is diverted through line 25 to manifold 26 and is employed to wash materials from the electrostatically charged plates of precipitator 20.

Due to the loss of heat incurred as oil is vaporized from the surface, the droplets emerging from the baffle section have been cooled to the extent that further vaporization will be slow and normally the liquid droplets would continue on to the condensing step. The application of a small amount of heat, particularly when applied directly to the surface of the droplets will induce further vaporization and consequently deeper flashing of the oil. This heat is applied by heater 19. Preferably the temperature of this heater should be 1200° F., or above, so that most of the energy available for heating the oil will be radiated from the surface of the ring rather than conducted to the oil by direct contact of the oil droplet and the hot ring. The purpose of baffles 16 is to minimize this direct contact of the oil droplets with the heater ring 19.

The surviving oil droplets containing concentrated tar, pitch, mineral matter and dissolved metallic compounds, together with the oil vapors, pass through the parallel and oppositely charged plates of the electrostatic precipitator. The plates of the precipitator are set at a slight angle to the axis of the flash chamber and are spaced sufficiently far apart so as not to cause appreciable pressure drop through the precipitator. Thus, impingement of the droplet with the plate will assist the electrostatic separation by a mechanical agglomeration of the droplets. Wide spacing of the plates and a minimum in change of direction of flow are essential to maintenance of a low pressure in the upstream section of the flash unit. Tar drains from the plates into the sump 21. If desired a small amount of the oil from compartment 17 can be continuously employed in washing down the plates of the precipitator and some cooling will thus be realized. The clean mist-free vapors emerging from precipitator 20 then proceed to conventional cooling coils or cooling tower and the condensed liquid is ready for further processing, for example, in a catalytic cracking process.

I have found that the step of adding supplemental heat to the flashed oil droplets in the form of radiant heat enables me to vaporize substantially all of the volatile materials in the heavy oil charge stock. I have also found that by employing the following step of separating the volatile and non-volatile materials immediately after the vaporization step that substantially all of these materials can be removed from the vapor. The tars which are extracted as virtually non-volatile materials form an additional product in themselves inasmuch as they contain, in them, no appreciable volatile material.

Reasonable variations and modifications are possible within the scope of the disclosure and drawing of this invention the essence of which is that by adding supplemental heat in the form of radiant heat to flashed oil in a distillation operation followed by separation of the non-volatile materials from the effluent vapors, more oil and cleaner oil can be recovered from a heavy oil charge stock than in the prior art methods of distillation.

I claim:

1. In a distillation process wherein distilland is heated in a first heating step to at least the vaporization temperature of the distilland and flashed into a distillation zone, the improvement which comprises further heating droplets of the flashed material in a second heating step substantially entirely by a source of radiant heat maintained at a temperature higher than the temperature of said first heating step and out of physical contact with said source of radiant heat; and separating liquid and solid residue from the distillate vapors.

2. A still comprising an elongated chamber; a spray nozzle disposed axially at one end of said chamber for introducing a distilland into said chamber as a spray of liquid droplets and vapor; a plurality of baffles spaced downstream from said distilland spray nozzle and each having a single center opening; a radiant heating means disposed coaxially with the longitudinal axis of the chamber downstream from said baffles and having an axial opening greater than those of said baffles; means located downstream from said heating means for separating vaporous and non-vaporous materials; and means for separately removing vaporous and non-vaporous materials from said chamber.

3. A vacuum still comprising in serial alignment within a shell; a spray nozzle disposed at one end of said shell; a plurality of baffles having circular center openings downstream from said nozzles; a cylindrical radiant heater having an axial diameter opening greater than that of said baffles and located downstream from said baffles; alternate and opposite electrically charged vertical plates located downstream from said heater and disposed at an angle from parallel with the said serial alignment sufficient so as to cause a slight change of direction of materials flowing therethrough; and conduits for separately removing vaporous and non-vaporous materials emerging from said plates from said shell.

4. A vacuum still comprising a substantially horizontal cylindrical shell closed at both ends and maintained at sub-atmospheric pressures; a narrow angle spray nozzle disposed at one end of said shell and communicating with an opening in the end thereof through which heated oil is forced into said shell; a plurality of circular baffles disposed downstream from said spray nozzle so as to restrict the moving droplets from said spray nozzle to the center portion of said shell; a conduit connected to an opening in the shell at a point intermediate said baffle so as to remove liquid deflected by said baffle; a liquid level controller connected to said shell and said conduit so as to maintain a liquid seal over said openings; a substantially cylindrical heating element having an internal diameter greater than the diameter of said baffles and disposed within said shell downstream from said baffles; a plurality of metallic plates arranged in vertical parallel relationship so as to substantially occupy the cross-sectional area of said shell at a point downstream from said heating element and disposed at a slight angle to the axis of said shell; a source of electrical potential connected to said plates so as to impart opposite charges upon alternate plates; a sump disposed below said plates connected to a conduit so as to remove liquid drained from said plates; a conduit disposed so as to transport a portion of said liquid deflected by said baffles and removed from said shell to said plates so as to wash the deposited material therefrom into said sump; and a conduit for removing clean oil vapors from said shell.

5. A vacuum still comprising an elongated chamber; a spray nozzle disposed axially at one end of said chamber for introducing a distilland into said chamber as a spray of liquid droplets and vapor in the direction of a hereinafter-referred-to plurality of baffles; a plurality of baffles spaced downstream from said distilland spray nozzle means and each having a single center opening; a heating means disposed coaxially with the longitudinal axis of the chamber downstream from said baffles and having an axial opening greater than those of said baffles; alternate and opposite electrically charged vertical plates located downstream from said heater; and means for separately removing vaporous and non-vaporous materials, emerging from said plates from said chamber.

6. A vacuum still comprising an elongated chamber closed at both ends and maintained at sub-atmospheric pressure; means for introducing a spray of liquid oil into one end of said chamber; a plurality of baffles having center openings disposed downstream from said oil spray so as to restrict the moving droplets of oil to the center portion of said chamber; means for removing deflected oil from said chamber; heating means disposed axially about said chamber disposed downstream from said baffles and having an axial opening therethrough greater than that of said baffles; a plurality of alternate and opposite electrically charged vertical plates arranged so as to substantially occupy the cross-sectional area of said chamber at a point downstream from said heating element; means for providing a stream of wash oil over said plates; means for removing said wash oil from said chamber; and means for removing clean oil vapors from said chamber.

7. In a vacuum distillation process wherein distilland is heated under superatmospheric pressure in a first heating step to at least the vaporization temperature of the distilland at subatmospheric pressure and flashed into a zone maintained at subatmospheric pressure the improvement which comprises further heating droplets of the flashed material in a second heating step substantially entirely by a source of radiant heat maintained at a temperature higher than the temperature of said first heating step and out of physical contact with said source of radiant heat; and separating liquid and solid residue from the distillate vapors by electrical precipitation.

8. In a vacuum distillation process wherein distillable oil is heated under superatmospheric pressure in a first heating step to at least the vaporization temperature of the oil at subatmospheric pressure and flashed into a zone maintained at subatmospheric pressure the improvement which comprises passing droplets of the flashed material substantially parallel to and spaced from a source of radiant heat maintained at a temperature higher than the temperature of said first heating step within said zone maintained at subatmospheric pressure; further heating droplets of said material in a second heating step with said source of radiant heat and out of physical contact with said source of radiant heat; subjecting said materials to the action of an electrical field so as to precipitate unvaporized material; and separately withdrawing vapors and unvaporized materials.

9. A vacuum distillation process which comprises heating a distillable oil to a temperature in the range 500–800° F. at a pressure in the range 200–500 p.s.i.a.; dispersing said liquid into a zone of sub-atmospheric pressure in the form of a narrow cone of discontinuous droplets of liquid and vapors; further heating said droplets substantially entirely by a source of radiant heat maintained at 1200–1500° F.; subjecting the materials treated to the action of an electrical field so as to precipitate unvaporized liquid and resulting solid material; and separately withdrawing vapors and precipitated material.

10. A substantially horizontal still comprising an elongated chamber; a spray nozzle disposed axially at one end of said chamber for introducing a distilland into one end of said chamber as a spray of liquid droplets and vapor in the direction of a hereinafter-referred-to plurality of baffles; a plurality of baffles each having a single center opening and spaced downstream from said distilland introducing means; a heating means encompassing the chamber downstream from said baffles and having an axial opening greater than those of said baffles; means for separating vaporous and non-vaporous materials located downstream from said heater and means for separately removing vaporous and non-vaporous materials from said chamber.

References Cited in the file of this patent

UNITED STATES PATENTS

| | | |
|---|---|---|
| 1,130,214 | Steere | Mar. 2, 1915 |
| 1,991,792 | Coubrough | Feb. 19, 1935 |
| 2,217,385 | Schulze et al. | Oct. 8, 1940 |
| 2,791,549 | Jahnig | May 7, 1957 |

UNITED STATES PATENT OFFICE
CERTIFICATE OF CORRECTION

Patent No. 2,904,509                          September 15, 1959

Carl J. Helmers

It is hereby certified that error appears in the printed specification of the above numbered patent requiring correction and that the said Letters Patent should read as corrected below.

Column 4, line 19, for "nozzles" read -- nozzle --.

Signed and sealed this 14th day of June 1960.

(SEAL)
Attest:
KARL H. Axline

Attesting Officer

ROBERT C. WATSON
Commissioner of Patents